(12) United States Patent
Shinnaka

(10) Patent No.: US 11,283,811 B2
(45) Date of Patent: Mar. 22, 2022

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yosuke Shinnaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 197 days.

(21) Appl. No.: 16/548,793

(22) Filed: Aug. 22, 2019

(65) Prior Publication Data

US 2020/0304512 A1 Sep. 24, 2020

(30) Foreign Application Priority Data

Mar. 20, 2019 (JP) .............................. JP2019-053820

(51) Int. Cl.
*G06F 21/00* (2013.01)
*H04L 29/06* (2006.01)
*H04L 9/08* (2006.01)

(52) U.S. Cl.
CPC .......... *H04L 63/105* (2013.01); *H04L 9/0897* (2013.01); *H04L 63/083* (2013.01); *H04L 63/0853* (2013.01); *H04L 63/102* (2013.01); *H04L 63/108* (2013.01); *H04L 2463/082* (2013.01)

(58) Field of Classification Search
CPC . H04L 63/105; H04L 63/083; H04L 63/0853; H04L 63/108; H04L 9/0897; H04L 63/102; H04L 2463/082; H04L 63/08; H04L 9/3247; H04L 9/0894
See application file for complete search history.

(56) References Cited

U.S. PATENT DOCUMENTS

| 10,527,874 B2 * | 1/2020 | Miyazaki | ................ G02F 1/011 |
| 2007/0055878 A1 * | 3/2007 | Sandhu | ..................... H04L 9/32 713/171 |

(Continued)

FOREIGN PATENT DOCUMENTS

| JP | 2004206703 | 7/2004 |
| JP | 2005078452 | 3/2005 |
| JP | 2015534138 | 11/2015 |

*Primary Examiner* — Kendall Dolly
(74) *Attorney, Agent, or Firm* — JCIPRNET

(57) ABSTRACT

An information processing apparatus that, when authentication is successfully performed by using first authentication information, permits access to first content. When authentication is successfully performed by using second authentication information which is different from the first authentication information, the information processing apparatus permits access to second content having a confidentiality level higher than a confidentiality level of the first content. The third authentication information is issued to a user in a period in which authentication using the second authentication information is valid. The third authentication information is different from the first authentication information and the second authentication information. When authentication is successfully performed by using both the first authentication information and the third authentication information, the information processing apparatus permits access to the second content.

19 Claims, 16 Drawing Sheets

(56) References Cited

U.S. PATENT DOCUMENTS

| | | |
|---|---|---|
| 2014/0164249 A1 | 6/2014 | Guerrino et al. |
| 2014/0245015 A1* | 8/2014 | Velamoor ............... G06F 21/10 |
| | | 713/171 |
| 2016/0182527 A1* | 6/2016 | Lietz .................... H04L 63/105 |
| | | 726/6 |
| 2016/0248752 A1* | 8/2016 | Blinn .................. H04L 63/0838 |
| 2019/0253269 A1* | 8/2019 | Keane ................... H04L 63/105 |
| 2020/0042723 A1* | 2/2020 | Krishnamoorthy ..... G06F 21/40 |

* cited by examiner

FIG. 7

| USER ID | PASSWORD |
|---------|----------|
| USER A  | ABC123   |
| USER B  | DEF456   |
| ...     | ...      |
| USER Z  | XYZ789   |

FIG. 8

| USER ID | CODE   | EXPIRY DATE |
|---------|--------|-------------|
| USER A  | XXXXXX | 2020/03/31  |
| USER B  | YYYYYY | 2019/12/31  |
| ...     | ...    | ...         |
| USER Z  | YYYYYY | 2020/03/31  |

FIG. 9

| USER ID | ACCESS RIGHT | |
|---------|---------------|----------------|
|         | FIRST CONTENT | SECOND CONTENT |
| USER A  | PERMITTED     | PROHIBITED     |
| USER B  | PERMITTED     | PERMITTED      |
| ...     | ...           | ...            |
| USER Z  | PROHIBITED    | PROHIBITED     |

| CODE | USER ID | EXPIRY DATE | ACCESSIBLE DOCUMENT |
|---|---|---|---|
| XXXXXX | USER A | 2020/03/31 | DOCUMENT A |
| YYYYYY | USER B | 2019/12/31 | DOCUMENT B |
| ... | ... | ... | ... |
| YYYYYY | USER Z | 2020/03/31 | DOCUMENT Z |

| USER ID | DECODING INFORMATION | |
|---|---|---|
| | PUBLIC KEY | RANDOM NUMBER |
| USER A | AAAAA | aaaaa |
| USER B | BBBBB | bbbbb |
| ... | ... | ... |
| USER Z | ZZZZZ | zzzzz |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053820 filed Mar. 20, 2019.

BACKGROUND

(i) Technical Field

The present disclosure relates to an information processing apparatus, an information processing system, and a non-transitory computer readable medium.

(ii) Related Art

Japanese Unexamined Patent Application Publication No. 2004-206703 discloses an authentication system which provides a code and performs authentication by using the code. The authentication system includes a communication unit provided on the user side and a computer connected to the communication unit through a communication line network. The computer includes an input unit, a code generating unit, a code storage unit, and a generated-information storage unit. The input unit receives input of information about the user. The code generating unit generates a code for the user. The code storage unit stores the generated code. The generated-information storage unit stores code generation information based on information about the user. The code generating unit generates a different code for each input of information about the user. The communication unit accesses the code storage unit, and displays the code. Authentication of the user is performed by using the code displayed on the communication unit.

Japanese Unexamined Patent Application Publication (Translation of PCT Application) No. 2015-534138 discloses a method of selectively permitting access over a computer network to two or more sets of information that have been assigned different confidentiality levels. The method includes using a computer to designate a first set of information or collection of data with a first level of permitted access; using a computer to designate a second set of information of collection of data with a second level of permitted access, the first and second sets of information stored on a non-transitory computer-readable medium; permitting access over a computer network to the first set of information via an authentication process that requires only a user ID and a password; and permitting access over a computer network to the second set of information via an authentication process that requires only a user ID, a password, and a hardware token.

Japanese Unexamined Patent Application Publication No. 2005-078452 discloses an access control method of controlling access to a web page which needs security management. In the method, when there is access, which needs authentication, from a given data communication terminal, a password is issued, and the issued password is transmitted by electronic mail to the wireless phone address that is preregistered for the data communication terminal. After that, when it is confirmed that the issued password is input to the data communication terminal, the authentication process is completed, and a web page having a high security level is accessed.

In access to content on a web site, accessible content may be restricted depending on how authentication is performed. Content indicates the content of information provided through a web site. In the case of a high confidentiality level, multi-factor authentication, in which authentication is performed on the basis of multiple types of authentication information, is typically used.

The multiple types of authentication information may be stored in a portable recording medium such as an IC card. Alternatively, the multiple types of authentication information may include an authentication code generated at each designated time by a portable device such as a hardware token.

For example, a user ID and a password are assumed to serve as first authentication information. The first authentication information is capable of being used to access only first content having a low confidentiality level. A user ID and confidential information which are held in an IC card are assumed to serve as second authentication information. The second authentication information is capable of being used to access second content having a high confidentiality level. When the second authentication information fails to be presented, for example, because an IC card is not carried, it is not possible to access the second content.

SUMMARY

Aspects of non-limiting embodiments of the present disclosure relate to an information processing apparatus, an information processing system, and a non-transitory computer readable medium. Assume an authentication method in which, when authentication using first authentication information is successfully performed, access to first content is permitted, and, when authentication using second authentication information different from the first authentication information is successfully performed, access to second content having a confidentiality level higher than that of the first content is permitted. In this authentication method, the information processing apparatus, the information processing system, and the non-transitory computer readable medium enable a user, who fails to present the second authentication information, to access the second content.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an authentication unit and an issuing unit. When authentication is successfully performed by using first authentication information received by a receiving unit, the authentication unit permits access to first content. When authentication is successfully performed by using second authentication information which is received by the receiving unit and which is different from the first authentication information, the authentication unit permits access to second content having a confidentiality level higher than a confidentiality level of the first content. The issuing unit issues third authentication information to a user in a period in which authentication using the second authentication information is valid. The third authentication information is different from the first authentication information and the second authentication information. The user is authenticated by using the second authentication information. When authentication is successfully performed by using both the first authentication information, which is received by the receiving unit, and the third authentication information, the authentication unit permits access to the second content.

BRIEF DESCRIPTION OF THE DRAWINGS

Exemplary embodiments of the present disclosure will be described in detail based on the following figures, wherein:

FIG. 7 is a diagram illustrating an exemplary authentication information management table;

FIG. 8 is a diagram illustrating an exemplary code management table;

FIG. 9 is a diagram illustrating an exemplary access right management table;

DETAILED DESCRIPTION

Figure 1:
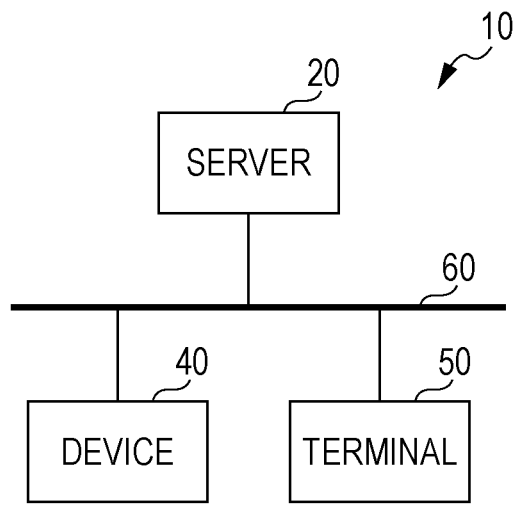
FIG. 1 is a block diagram illustrating an exemplary configuration of an information processing system according to a first exemplary embodiment of the present disclosure.

Exemplary embodiments of the present disclosure will be described in detail below by referring to the drawings.
Information Processing System An overview of operations in an information processing system according to an exemplary embodiment will be described.

The information processing system includes a device and a terminal which are used by a user, and also includes a server providing a specific service. A user may use the specific service from the device and the terminal. Each of the device, the terminal, and the server is formed of an information processing apparatus. The server is an example of the information processing apparatus provided by the present disclosure.

A user uses an app to access the specific service. The app indicates a web application. The app is application software operating on a web browser over a network. The app operates in such a manner that web browser programs collaborate with web system programs. A user installs web browser programs in an information processing apparatus having a web browser, so as to use the app.

Accessible content in the specific service is classified into first content and second content which has a confidentiality level higher than that of the first content. A user is given in advance two types of authentication information, that is, first authentication information and second authentication information, in accordance with the confidentiality levels of content. When a user is authenticated by using the first authentication information, the user may access only the first content. When a user is authenticated by using the second authentication information, the user is permitted to access the second content having a higher confidentiality level.

In a period in which authentication using the second authentication information is valid, third authentication information different from the first authentication information and the second authentication information is issued to a user. When a user is authenticated by using both the first authentication information and the third authentication information, the user is permitted to access the second content having a higher confidentiality level.

For example, the first authentication information is assumed to be a user ID and a password. A user ID is identification information for identifying a user. The second authentication information is assumed to be a user ID and confidential information held in an IC card. The third authentication information is assumed to be an authentication code. The authentication code is a string such as a five-digit number.

An input screen for inputting an authentication code is displayed to a user who has been authenticated by using their user ID and password. When a code, which is input from a user, matches the issued authentication code, the user is authenticated and is permitted to access the second content.

There is a user who usually does not carry an IC card because the user rarely accesses content having a high confidentiality level, or the user is afraid of losing the IC card. Such a user feels that carrying an IC card to access the second content is troublesome. Even when a user does not carry their IC card, the user may input an authentication code to access the second content having a high confidentiality level. Thus, the trouble experienced by a user may be avoided.

This is not limited to the case in which the second authentication information is held in an IC card. For example, assume the case in which it is not possible to input the second authentication information on an input screen, for example, because a user forgets to carry their IC card. Even in this case, if the user is authenticated by using both the first authentication information and the third authentication information, it is not necessary to input the second authentication information.

Hereinafter, the first authentication information is assumed to be a user ID and a password. The second authentication information is assumed to be a user ID and confidential information which are held in an IC card. The third authentication information is assumed to be an authentication code, and is called simply a "code". The three types of authentication information are differentiated in such a manner as to be referred to as first authentication information, second authentication information, and a code, correspondingly.

In the exemplary embodiment, a code is issued with an expiry date, for example, indicating that the code is valid within 24 hours from the issue. By setting an expiry date, a code will be invalid after the expiry date. Even when a code is leaked, damage such as unauthorized access to the second content is avoided after the expiry date. If a code, which is input by a user, matches the issued code, and if the expiry date of the issued code has not come, the user is authenticated, and is permitted to access the second content.

The Configuration of the Information Processing System

An exemplary configuration of the information processing system will be described.

FIG. 1 is a block diagram illustrating an exemplary configuration of the information processing system according to a first exemplary embodiment of the present disclosure. An information processing system 10 includes a server 20 which provides a specific service through an app. The server 20, which provides the service of the app, is disposed on a cloud. The server 20 provides an application programming interface (API) to an app. The server 20 performs various processes in accordance with a request from an app which is a web client.

The information processing system 10 includes a device 40 and a terminal 50 which are used by a user. In the first exemplary embodiment, the device 40 is an image forming apparatus provided with multiple functions, such as a copying function, a printing function, a scanning function, and a faxing function. The terminal 50 is a mobile terminal which is portable. Each of the device 40 and the terminal 50 has a web browser (see FIGS. 3 and 5). An app for providing the specific service is installed in each of the device 40 and the terminal 50 (see FIGS. 3 and 5).

The server 20, the device 40, and the terminal 50 are connected to each other through a wired or wireless communication line 60, such as the Internet or a local-area network (LAN). In the first exemplary embodiment, the server 20 transmits screen information such as Hypertext Markup Language (HTML) files to the device 40 and the terminal 50, and causes various screens to be displayed.

The Server

The configuration of the server 20 will be described.

Figure 2:
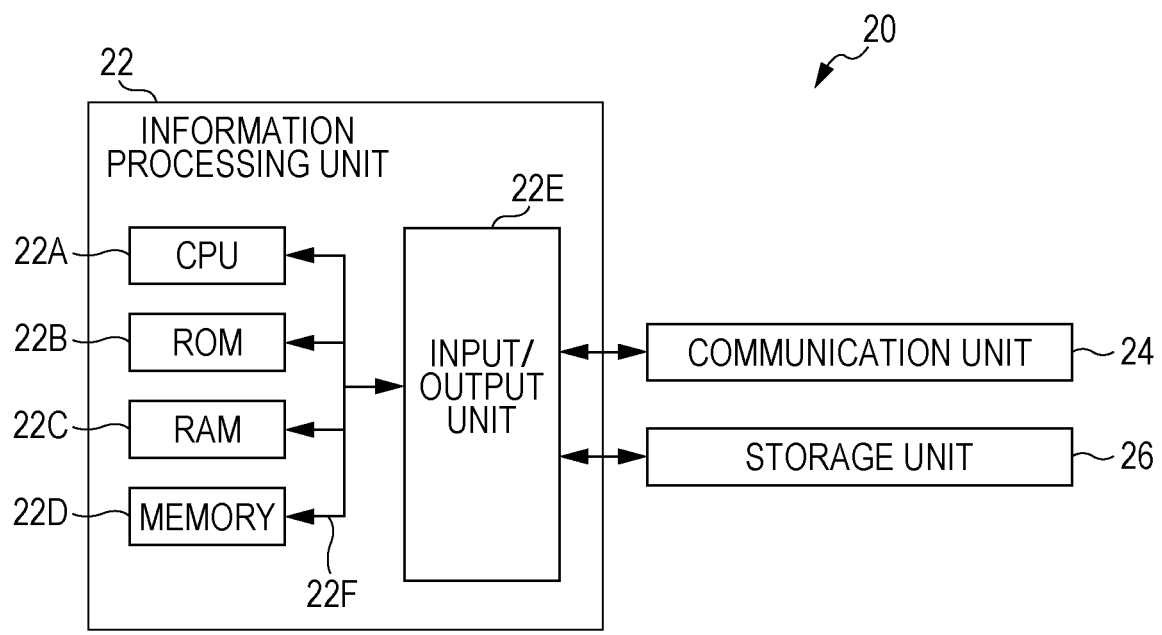
FIG. 2 is a block diagram illustrating an exemplary electrical configuration of a server.

FIG. 2 is a block diagram illustrating an exemplary electrical configuration of a server. The server 20 includes an information processing unit 22 which is a computer controlling the entire apparatus and performing various computations. The information processing unit 22 includes a central processing unit (CPU) 22A, a read-only memory (ROM) 22B used to store various programs, a random-access memory (RAM) 22C used as a work area in execution of programs, a nonvolatile memory 22D, and an input/output unit 22E. The CPU 22A, the ROM 22B, the RAM 22C, the memory 22D, and the input/output unit 22E are connected to each other through a bus 22F.

The server 20 includes a communication unit 24 and a storage unit 26. The communication unit 24 is an interface for communicating with external apparatuses. The storage unit 26 is an external storage device such as a hard disk. The communication unit 24 and the storage unit 26 are connected to the input/output unit 22E. The information processing unit 22 receives/transmits information from/to the units so as to control the units.

A control program for an "authentication process" described below is stored in the ROM 22B of the information processing unit 22. Various "management tables" are stored in the storage unit 26. Various programs and various types of data may be stored in a different storage device inside or outside of the apparatus, or may be recorded in a recording medium such as a compact disc-read-only memory (CD-ROM). Alternatively, various programs and various types of data may be obtained through communication.

The Device

The configuration of the device 40 will be described.

Figure 3:
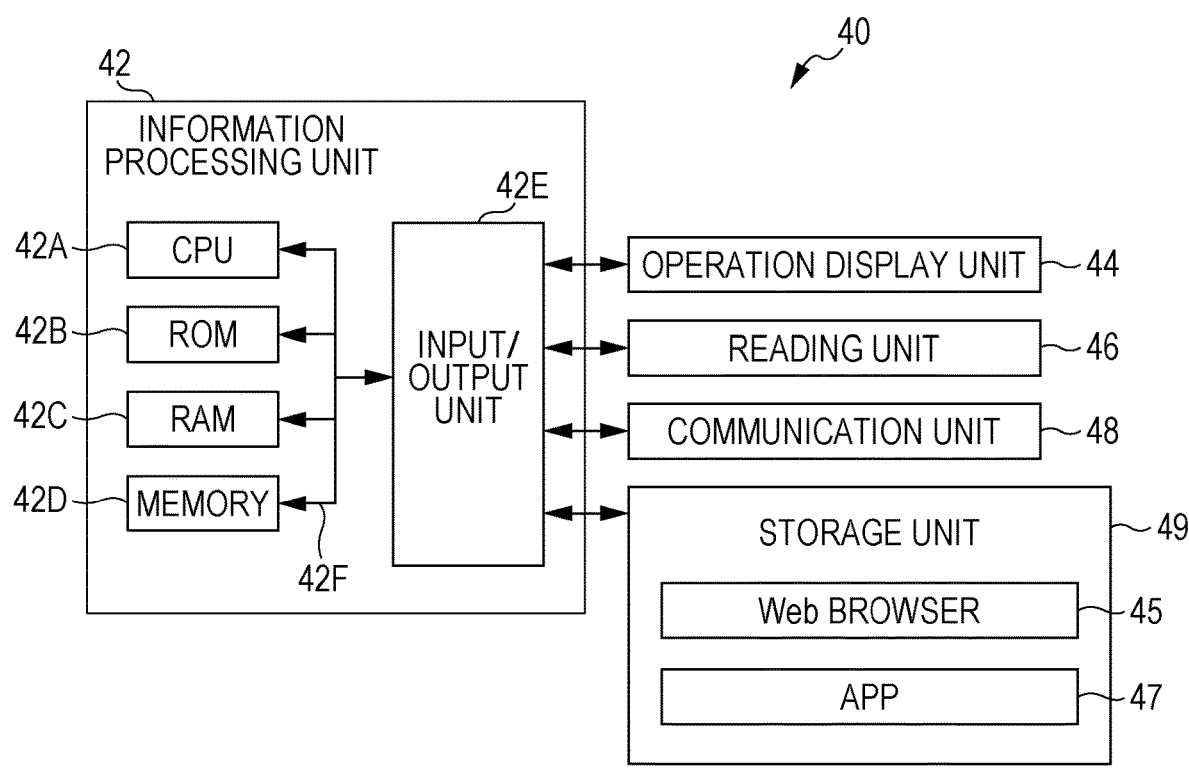
FIG. 3 is a block diagram illustrating an exemplary electrical configuration of a device.

FIG. 3 is a block diagram illustrating an exemplary electrical configuration of a device. The device 40 includes an information processing unit 42 which is a computer controlling the entire apparatus and performing various computations. The information processing unit 42 includes a CPU 42A, a ROM 42B used to store various programs, a RAM 42C used as a work area in execution of programs, a nonvolatile memory 42D, and an input/output unit 42E. The CPU 42A, the ROM 42B, the RAM 42C, the memory 42D, and the input/output unit 42E are connected to each other through a bus 42F.

The device 40 includes an operation display unit 44, a reading unit 46, a communication unit 48, and a storage unit 49. The operation display unit 44 is an interface for displaying various types of information to a user and receiving operations from a user. The reading unit 46 is an apparatus such as a scanner which reads information recorded on a medium. The communication unit 48 is an interface for communicating with external apparatuses. The storage unit 49 is an external storage device such as a hard disk. The operation display unit 44, the reading unit 46, the communication unit 48, and the storage unit 49 are connected to the input/output unit 42E. The information processing unit 42 receives/transmits information from/to the units and controls the units.

The storage unit 49 stores a Web browser 45, an app 47, and the like. Various programs and various types of data may be stored in a different storage device inside or outside of the apparatus, or may be recorded in a recording medium such as a CD-ROM. Alternatively, various programs and various types of data may be obtained through communication.

Figure 4:
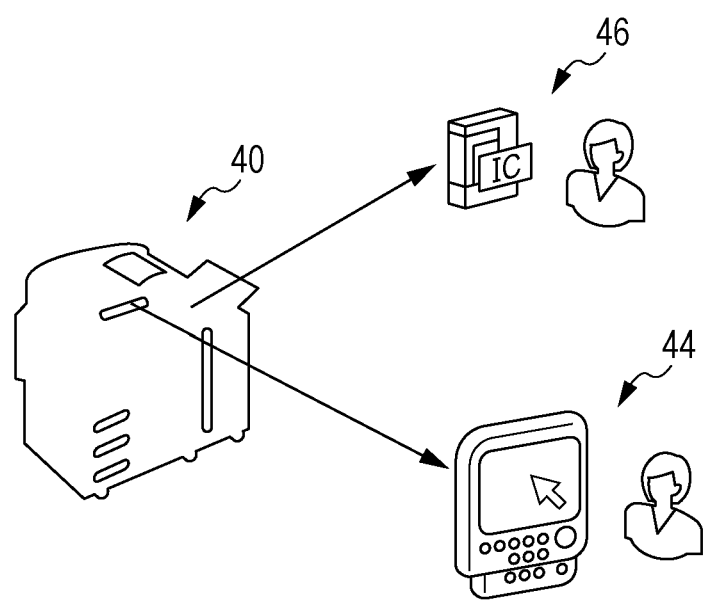
FIG. 4 is a schematic diagram illustrating an exemplary configuration of an operation display unit and an authentication unit of a device.

FIG. 4 is a schematic diagram illustrating an exemplary configuration of the operation display unit and the authentication unit of a device. In the first exemplary embodiment, the device 40 includes an operation panel as the operation display unit 44, and includes an IC card reader as the reading unit 46.

The operation panel includes a touch panel display and various buttons. Various screens such as a login screen are displayed on the touch panel display. The IC card reader is an apparatus which reads information from an IC card.

The IC card reader is used for authentication using an IC card. In an operation for authentication using an IC card, information recorded in the IC card carried by a user is read by the IC card reader. When the information, which has been read, matches predetermined authentication information, the user is authenticated.

The Terminal

The configuration of the terminal 50 will be described.

Figure 5:
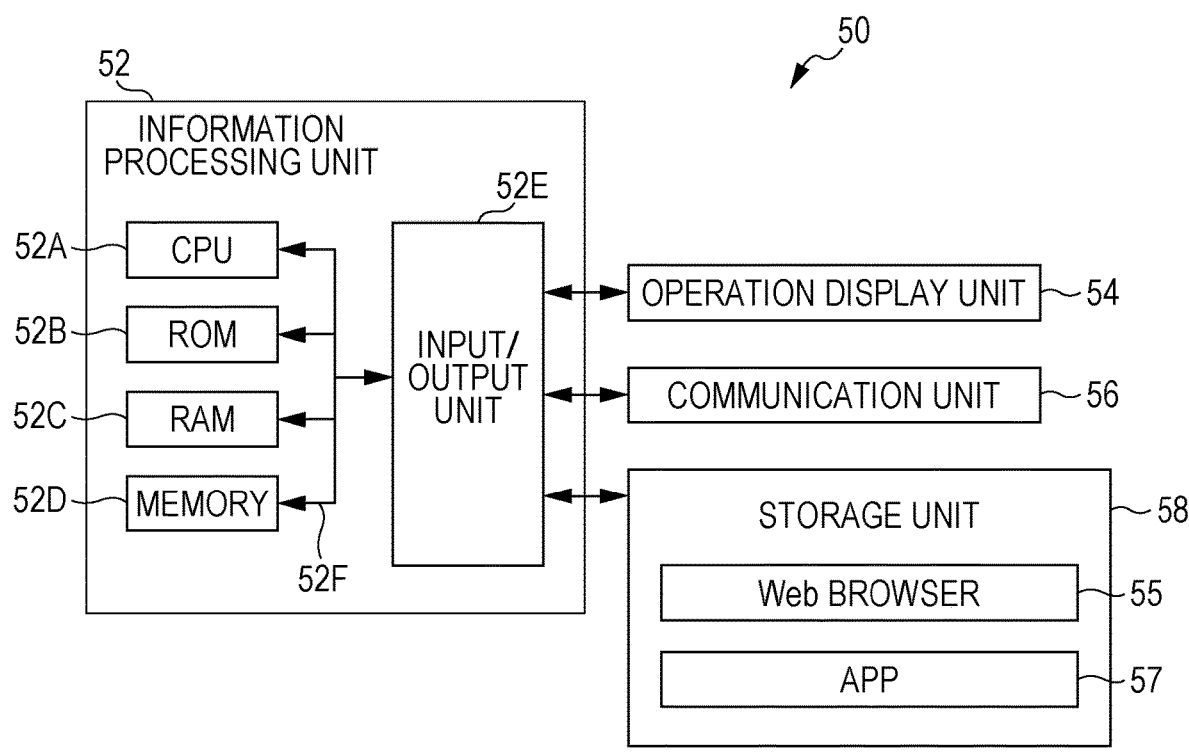
FIG. 5 is a block diagram illustrating an exemplary electrical configuration of a terminal.

FIG. 5 is a block diagram illustrating an exemplary electrical configuration of a terminal. The terminal 50 includes an information processing unit 52 which is a computer controlling the entire apparatus and performing various computations. The information processing unit 52 includes a CPU 52A, a ROM 52B used to store various programs, a RAM 52C used as a work area in execution of programs, a nonvolatile memory 52D, and an input/output unit 52E. The CPU 52A, the ROM 52B, the RAM 52C, the memory 52D, and the input/output unit 52E are connected to each other through a bus 52F.

The terminal 50 includes an operation display unit 54, a communication unit 56, and a storage unit 58. The operation display unit 54 is an interface for displaying various types of information to a user and receiving operations of a user. The communication unit 56 is an interface for communicating with external apparatuses. The storage unit 58 is an external storage device such as a hard disk. The communication unit 56 and the storage unit 58 are connected to the input/output unit 52E. The information processing unit 52 receives/transmits information from/to the units and controls the units.

The storage unit 58 stores a Web browser 55, an app 57, and the like. Various programs and various types of data may be stored in a different storage device inside or outside of the apparatus, or may be recorded in a recording medium such as a CD-ROM. Alternatively, various programs and various types of data may be obtained through communication.

The Functional Configuration

The functional configuration of the information processing system will be described.

Figure 6:
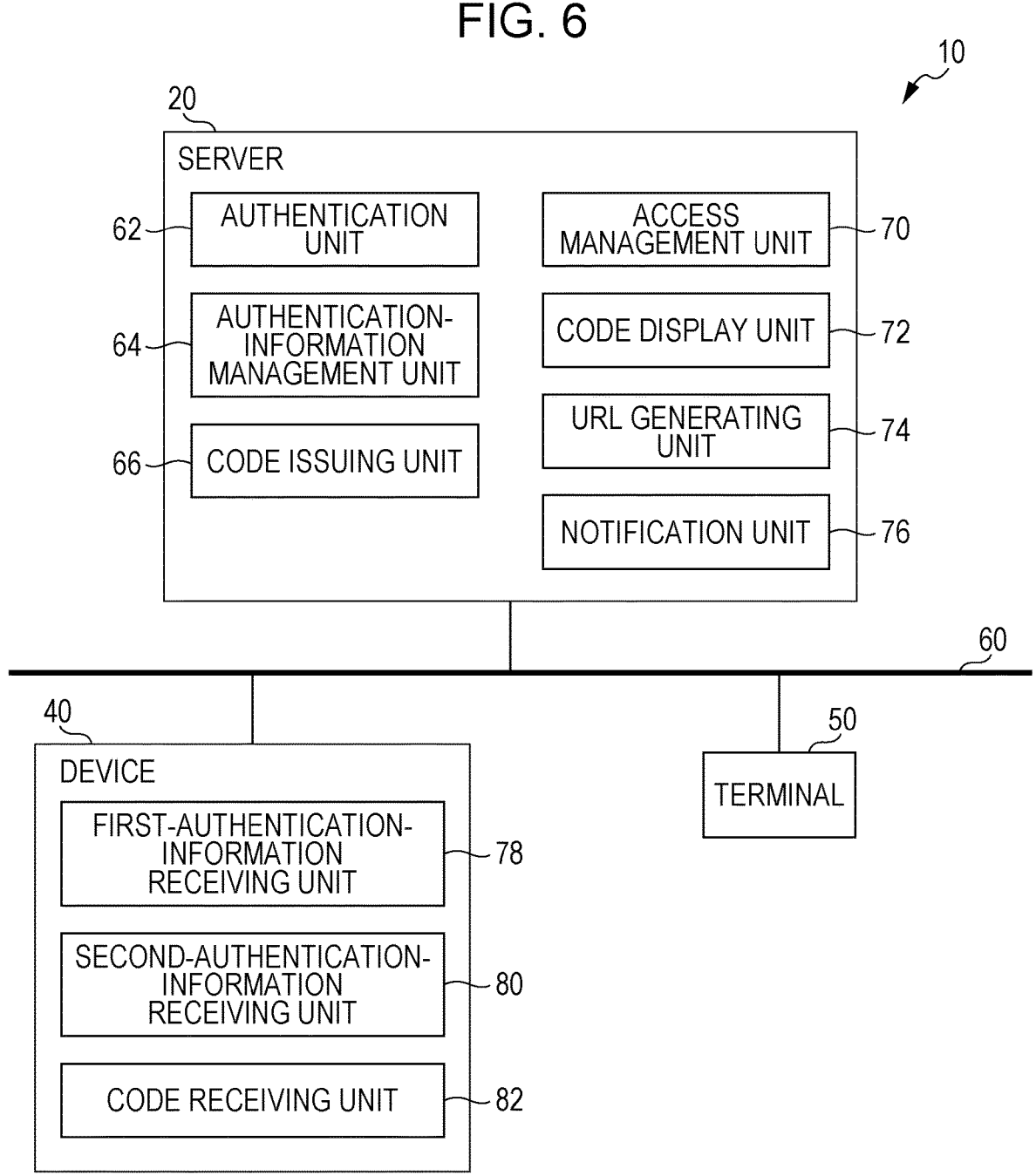
FIG. 6 is a block diagram illustrating an exemplary functional configuration of an information processing system according to the first exemplary embodiment.

FIG. 6 is a block diagram illustrating an exemplary functional configuration of an information processing system according to the first exemplary embodiment.

The Device

As illustrated in FIG. 6, the device 40 includes a first-authentication-information receiving unit 78, a second-authentication-information receiving unit 80, and a code receiving unit 82.

The first-authentication-information receiving unit 78 receives the first authentication information from a user. In the first exemplary embodiment, a login screen for receiving input of the first authentication information is displayed on the operation display unit 44 (see FIG. 4) of the device 40, and input of the first authentication information is received from a user.

The second-authentication-information receiving unit 80 receives the second authentication information from a user. In the first exemplary embodiment, the IC card reader which is the reading unit 46 (see FIG. 4) of the device 40 is used to read information recorded in an IC card carried by a user, and the second authentication information is received from the user.

The code receiving unit 82 receives the third authentication information from a user. In the first exemplary embodiment, after authentication using the first authentication information, a code input screen for receiving input of a code is displayed on the operation display unit 44 (see FIG. 4) of the device, and input of a code is received from the user.

The Server

As illustrated in FIG. 6, the server 20 includes an authentication unit 62, an authentication-information management unit 64, a code issuing unit 66, an access management unit 70, a code display unit 72, a uniform resource locator (URL) generating unit 74, and a notification unit 76.

The authentication unit 62 performs authentication using the first authentication information, authentication using the second authentication information, and authentication using a code. If information received from a user matches the information held by the authentication-information management unit 64, it is determined that authentication is successfully performed. If a code is provided with an expiry date, it is checked whether or not the code is valid.

The authentication-information management unit 64 holds pieces of authentication information, such as the first authentication information, the second authentication information, and codes. For example, user IDs and passwords, which are the first authentication information, are stored in the format of an authentication information management table. FIG. 7 is a diagram illustrating an exemplary authentication information management table. In the authentication information management table, each user is represented by their user ID. A corresponding password is stored for each user.

Information about codes is stored in the format of a code management table. FIG. 8 is a diagram illustrating an exemplary code management table. In the code management table, codes and their expiry dates are stored in association with user IDs.

The code issuing unit 66 receives a request to issue a code, and issues a code. That is, a code is issued in response to a request from a user. In the first exemplary embodiment, a code issue request screen for requesting issue of a code is displayed on the operation display unit 44 (see FIG. 4) of the device 40 in a period in which authentication using the second authentication information is valid. Thus, a request to issue a code is received from a user. When an expiry date is set for a URL for accessing a code, a request to issue a code is received only before the expiry date.

The access management unit 70 manages access rights for pieces of content. For example, the access rights are stored in the format of an access management table. FIG. 9 is a diagram illustrating an exemplary access right management table. In the access right management table, whether or not an access right for the first content is present and whether or not an access right for the second content is present are stored in association with each user ID.

For example, in a period in which authentication using the first authentication information is valid, presence of the access right for the first content is set. In a period in which authentication using the second authentication information is valid, presence of the access right for the second content is set.

The URL generating unit 74 generates a code display screen for displaying a code and a URL for the code display screen.

The notification unit 76 transmits electronic mail, in which the URL is described, to the preregistered address of a user to notify the user of the URL. In the first exemplary embodiment, it is assumed that the address of a user is an address used on the terminal, and the terminal receives the electronic mail.

When the user accesses the URL and authentication using the first authentication information succeeds, the code display unit 72 displays a code display screen on the terminal of the user.

The Terminal

The terminal 50 displays information, including the URL notified from the notification unit 76 of the server 20, on the operation display unit 54 (see FIG. 5) of the terminal 50. On the operation display unit 54 (see FIG. 5) of the terminal 50, an input screen and a code display screen are displayed according to a "code display process" described below.

Authentication Processes/Programs

A control program for the "authentication process" will be described.

Figure 10:
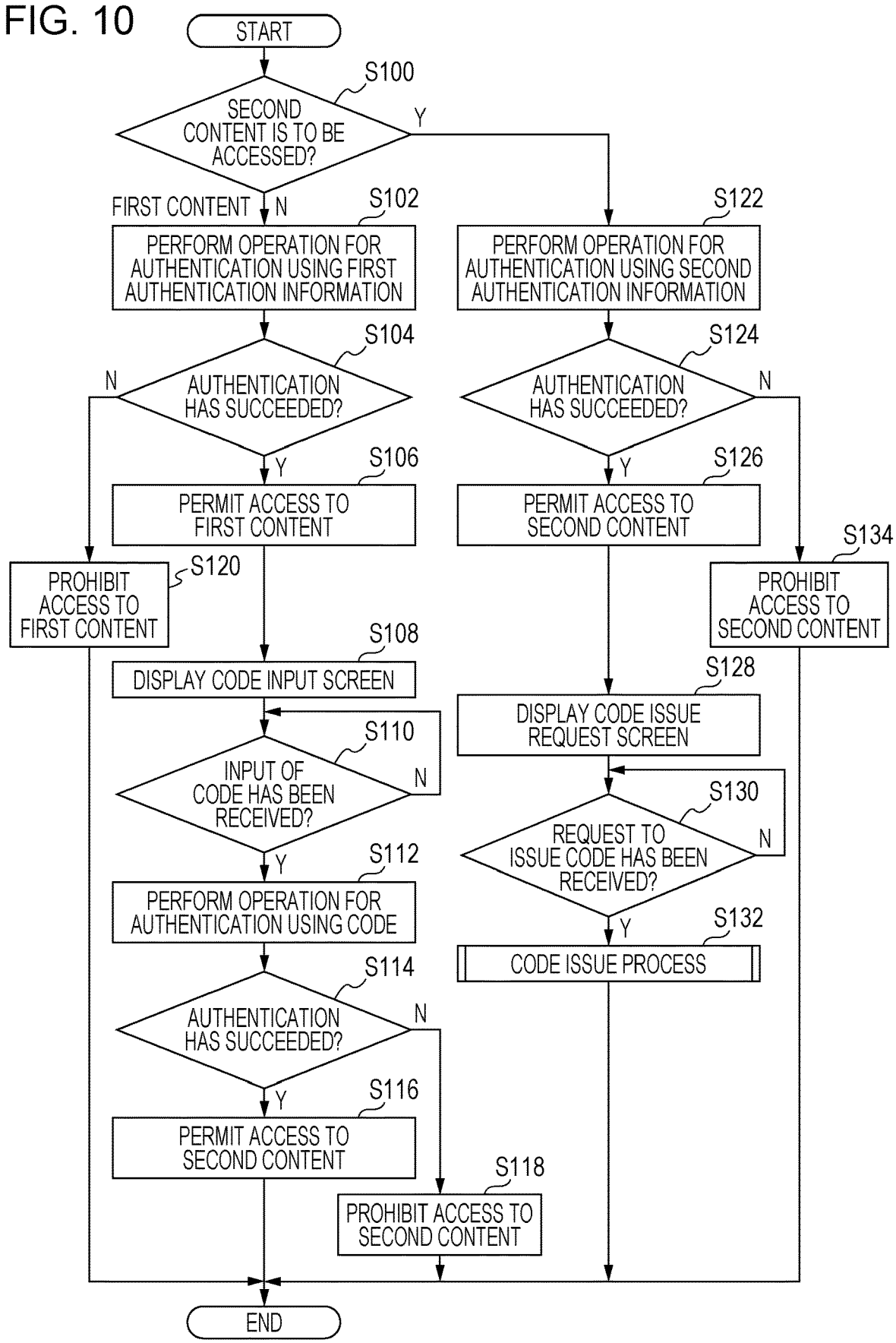
FIG. 10 is a flowchart of an exemplary authentication process.
Figure 11:
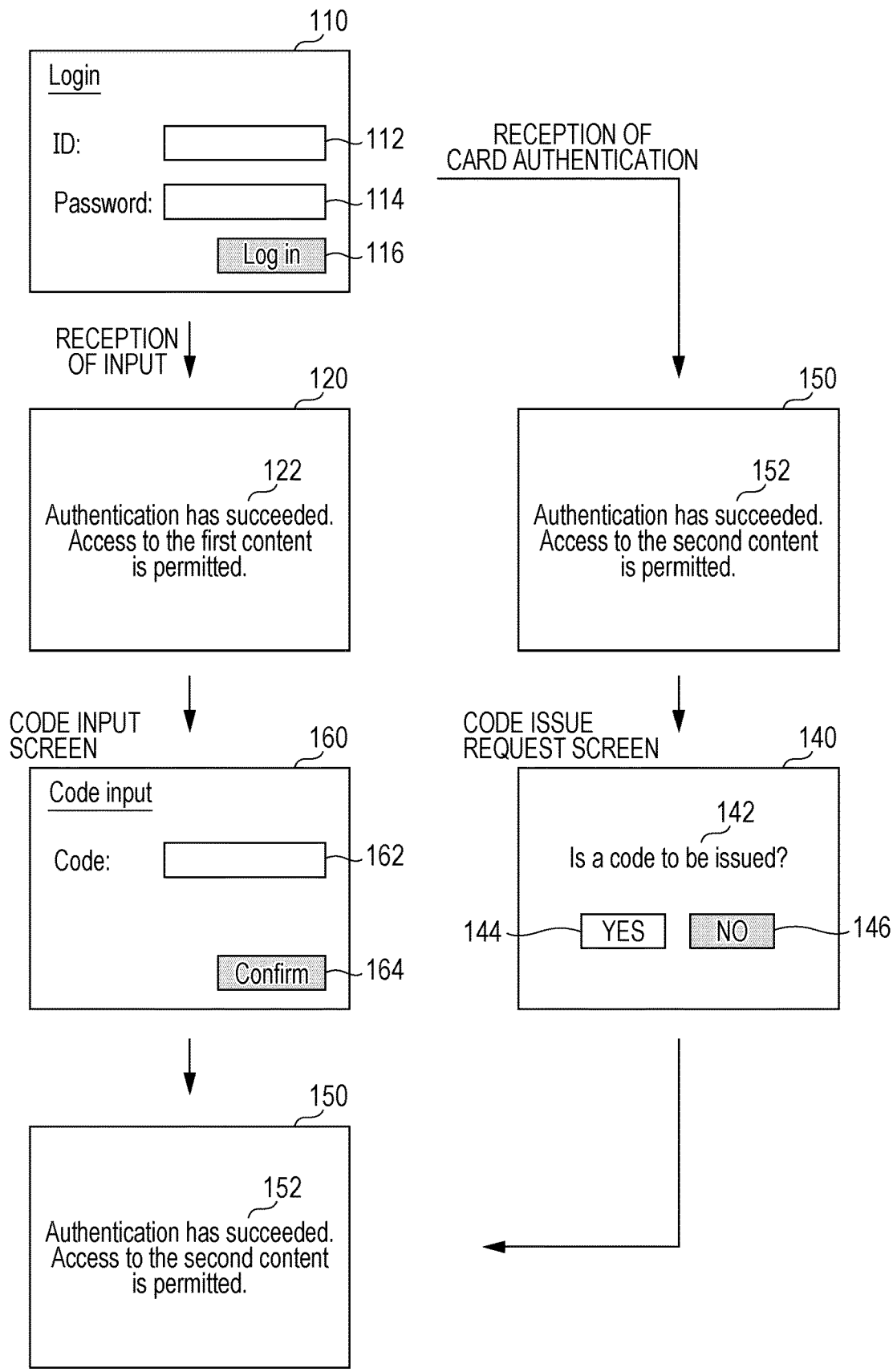
FIG. 11 is a screen transition diagram illustrating an example of display screens.

FIG. 10 is a flowchart of an exemplary authentication process. The CPU 22A of the server 20 reads, for execution, the control program for the "authentication process" from the ROM 22B (see FIG. 2). The "authentication process" starts when authentication information is received. FIG. 11 is a screen transition diagram illustrating an example of display screens. Referring to FIG. 11, screens displayed on the operation display unit of a device will be also described.

As illustrated in FIG. 11, before start of the authentication process, a login screen 110 for receiving input of the first authentication information is displayed as a standby screen on the operation display unit of the device. The first authentication information is a user ID and a password. The login screen 110 includes a box 112 for inputting a user ID, a box 114 for inputting a password, and an instruction button 116 for transmitting an instruction to log in. A user inputs their user ID and password, and transmits an instruction to log in.

In step 100, it is determined whether or not the second content having a high confidentiality level is to be accessed.

When information, which is input from the login screen 110 illustrated in FIG. 11, is obtained, authentication using the first authentication information is performed, and the first content is accessed. In contrast, when information read from an IC card by using the reading unit 46 of the device illustrated in FIG. 4 is obtained, authentication using the second authentication information is performed, and the second content is accessed.

If the second content is not to be accessed, that is, if the first content is to be accessed, the process proceeds to step 102. In contrast, if the second content is to be accessed, the process proceeds to step 122.

Access to the First Content

In step 102, an operation for authentication using the first authentication information is performed. It is determined whether or not information received from the user matches the first authentication information held in the authentication-information management unit. If the pieces of information match each other, the authentication succeeds. If the pieces of information do not match each other, the authentication fails.

In step 104, it is determined whether or not authentication using the first authentication information has succeeded. If authentication of the user has succeeded, the process proceeds to step 106. In step 106, access to the first content is permitted. In contrast, if authentication of the user has failed, the process proceeds to step 120. In step 120, access to the first content is prohibited, and the routine ends.

In this stage, a notification screen for notifying the user of whether or not authentication has succeeded may be displayed. For example, as illustrated in FIG. 11, a notification screen 120 including a message 122 such as "Authentication has succeeded. Access to the first content is permitted." is displayed.

Access to the Second Content Using a Code

In step 108, a code input screen for receiving input of a code is displayed on the operation display unit of the device. As illustrated in FIG. 11, a code input screen 160 includes a box 162 for inputting a code, and a confirm button 164 for confirming the input content. The user inputs a code, presses the confirm button, and confirms the input content.

In step 110, it is determined whether or not input of a code has been received. If input of a code has been received from the user, the process proceeds to step 112. In contrast, if input of a code has not been received from the user, the determination is repeatedly performed in step 110.

In step 112, an operation for authentication using a code is performed. First, it is determined whether or not information received from the user matches the code held by the authentication-information management unit. Then, it is determined whether or not the code is valid. If the time when the authentication is performed is before the expiry date which is set for the code, the code is valid.

In step 114, it is determined whether or not the authentication using a code has succeeded. If the information received from the user matches the code which is held, and if the code is valid, the authentication succeeds. If the information received from the user does not match the code which is held, or if the code has been expired, the authentication fails.

If authentication of the user has succeeded, the process proceeds to step 116. In step 116, access to the second content is permitted, and the routine ends. In contrast, if authentication of the user has failed, the process proceeds to step 118. In step 118, access to the second content is prohibited, and the routine ends.

A notification screen for notifying the user of whether or not the user has been authenticated may be displayed. For example, as illustrated in FIG. 11, a notification screen 150 including a message 152 such as "Authentication has succeeded. Access to the second content is permitted." is displayed.

Access to the Second Content Using an IC Card

In step 122, an operation for authentication using the second authentication information is performed. It is determined whether or not information received from the user matches the second authentication information held by the authentication-information management unit. If the two pieces of information match each other, the authentication succeeds. If the two pieces of information do not match each other, the authentication fails.

In step 124, it is determined whether or not authentication using the second authentication information has succeeded. If authentication of the user has succeeded, the process proceeds to step 126. In step 126, access to the second content is permitted. In contrast, authentication of the user has failed, the process proceeds to step 134. In step 134, access to the second content is prohibited, and the routine ends.

In this stage, a notification screen for notifying the user of whether or not the authentication has succeeded may be displayed. For example, as illustrated in FIG. 11, the notification screen 150 including the message 152 such as "Authentication has succeeded. Access to the second content is permitted." is displayed.

In step 128, a code issue request screen for receiving a request to issue a code is displayed on the operation display unit of the device. As illustrated in FIG. 11, a code issue request screen 140 includes a message 142 for prompting a request to issue a code, an instruction button 144 for transmitting an instruction to issue a code, and an instruction button 146 for transmitting an instruction not to issue a code. The message 142 describes, for example, "Is a code to be issued?" The user requests issue of a code.

In step 130, it is determined whether or not a request to issue a code has been received. If a request to issue a code has been received, the process proceeds to step 132. In contrast, if a request to issue a code has not been received, the determination is repeatedly performed in step 130. In step 132, a code issue process for issuing a code is performed, and the routine ends.

In the example in FIG. 11, the example in which the code input screen 160 is displayed at the timing at which authentication using the first authentication information is successfully performed, and the example in which the code issue request screen 140 is displayed at the timing at which authentication using the second authentication information is successfully performed are described. The timings at which the screens are displayed are not limited to these.

Figure 12:
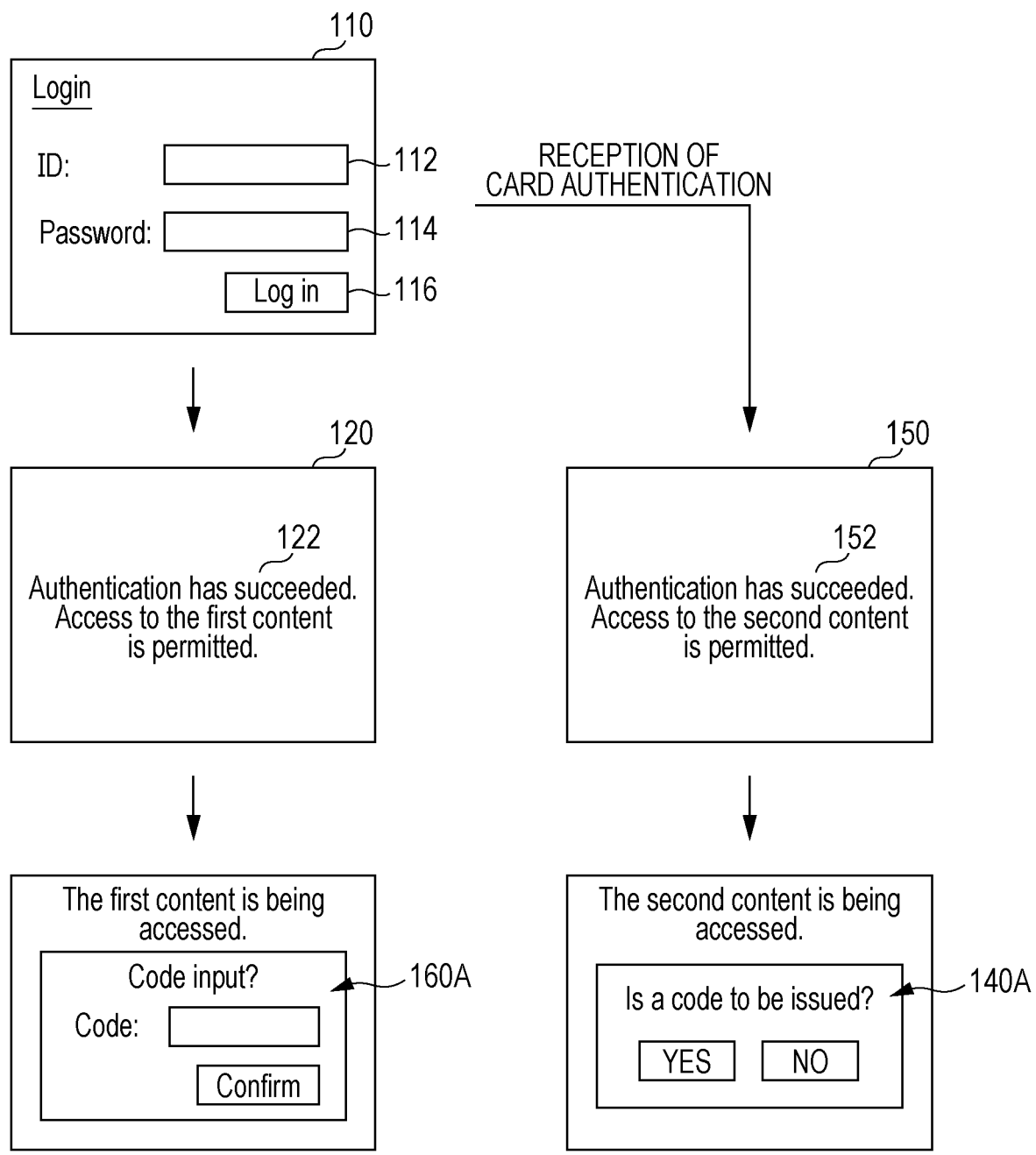
FIG. 12 is a screen transition diagram illustrating another example of display screens.

FIG. 12 is a screen transition diagram illustrating another example of display screens. For example, while the first content is being accessed, a reduced image 160A of the code input screen 160 may be displayed on the screen which is being accessed. Alternatively, a button for making a transition to the code input screen 160 may be displayed on the screen which is being accessed. When the button is pressed, the code input screen 160 may be displayed.

Similarly, while the second content is being accessed, a reduced image 140A of the code issue request screen 140 may be displayed on the screen that is being accessed. Alternatively, a button for making a transition to the code issue request screen 140 may be displayed on the screen that is being accessed. When the button is pressed, the code issue request screen 140 may be displayed.

The Code Issue Process

The procedure of the "code issue process" will be described.

Figure 13:
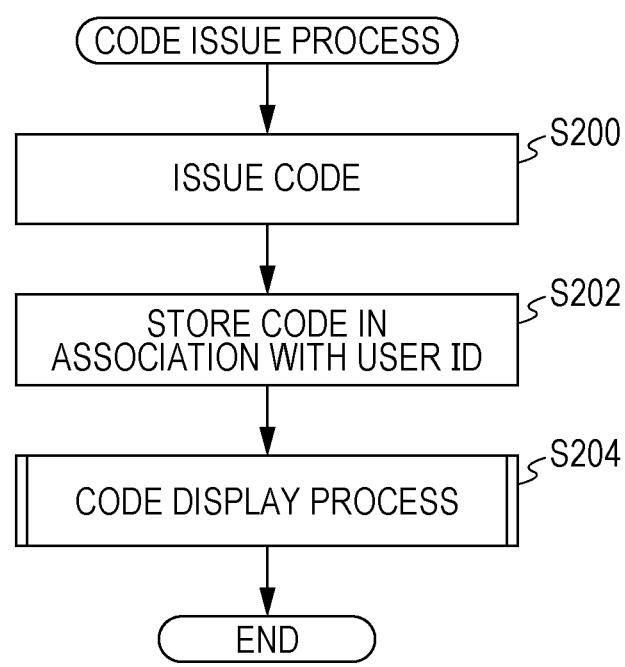
FIG. 13 is a flowchart of an exemplary code issue process.

FIG. 13 is a flowchart of an exemplary code issue process.

In step 200, a code is issued. In step 202, the issued code is stored in association with a user ID. A correspondence among the user ID, the issued code, and the expiry date for the code is added to the code management table illustrated in FIG. 8. In step 204, the "code display process" for displaying the code on the operation display unit of the terminal used by the user is performed, and the routine ends.

The Code Display Process

The procedure of the "code display process" will be described.

Figure 14:
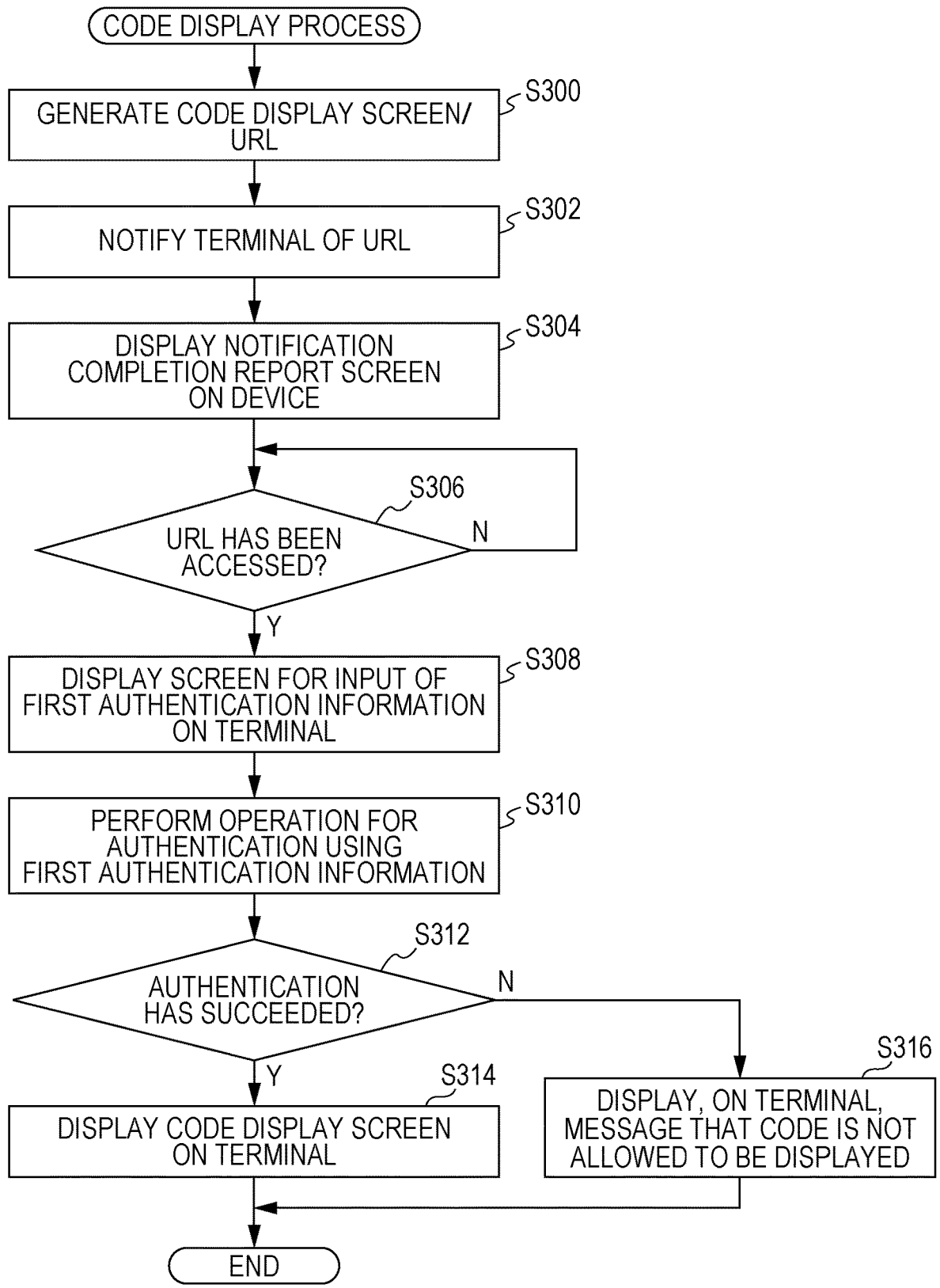
FIG. 14 is a flowchart of an exemplary code display process.

FIG. 14 is a flowchart of an exemplary code display process.

In step 300, a code display screen for displaying a code, and a URL for opening the code display screen from the terminal are generated.

In the first exemplary embodiment, similarly to a code, a validity period may be set for the URL. The validity period for the URL may be, for example, ten minutes from the issue. By setting a validity period, the URL will be invalid after elapse of the validity period. Even when the URL is leaked, damage such as unauthorized access to the second content may be avoided after elapse of the validity period.

In step 302, the terminal of the user is notified of the URL. The notification to the user causes invalid use by a person other than the user to be reduced. In step 304, a report screen for reporting completion of the notification of the URL to the terminal is displayed on the device.

Figure 15:
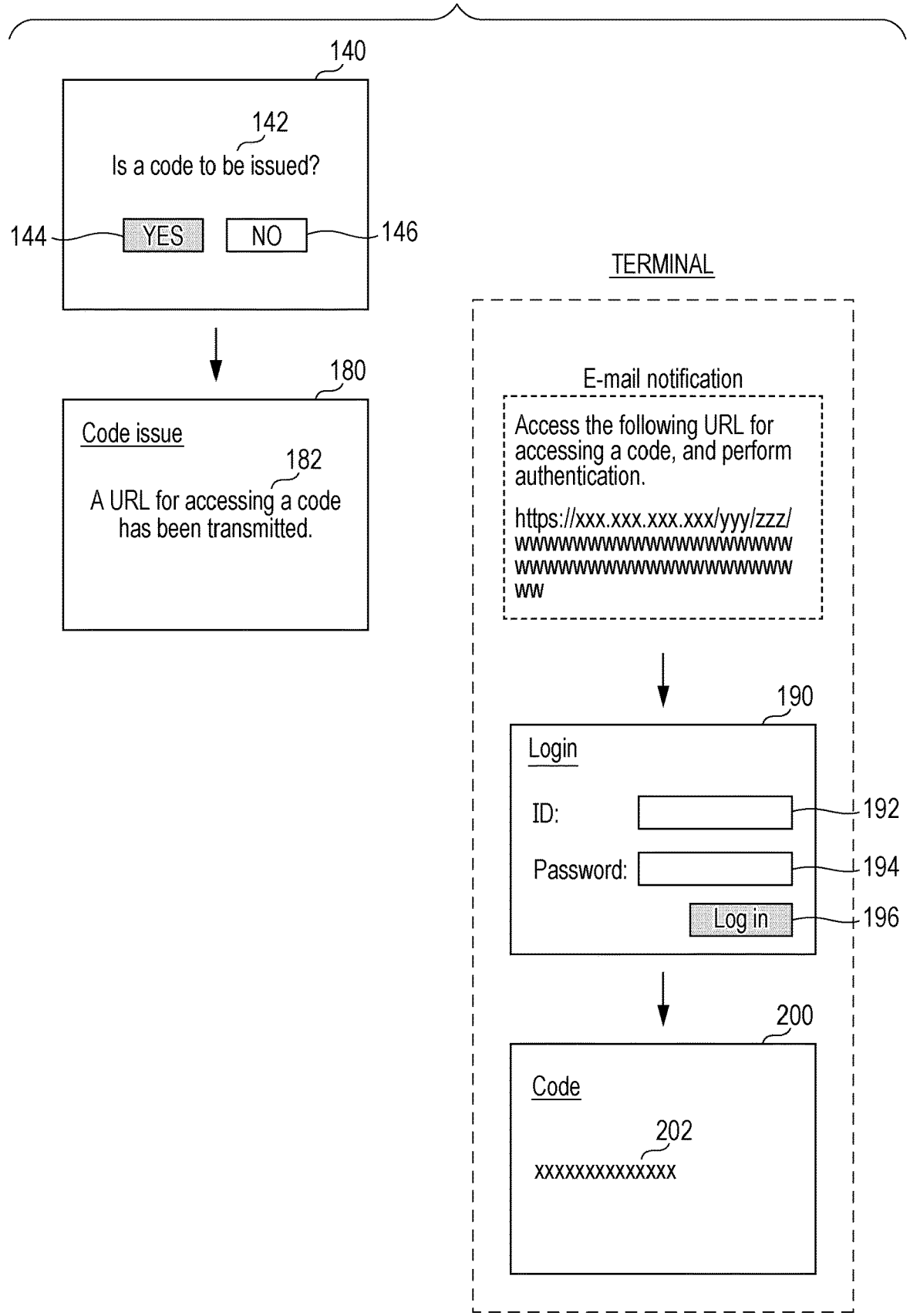
FIG. 15 is a screen transition diagram illustrating an example of screens displayed on a device and a terminal.

FIG. 15 is a screen transition diagram illustrating an example of screens displayed on the device and the terminal. As illustrated in FIG. 15, when the server 20 receives a request to issue a code from the code issue request screen 140, the server 20 notifies the terminal of a URL for opening a code display screen 200, for example, by electronic mail.

For example, the electronic mail describes the URL and a message such as "Access the URL, described below, to access a code, and perform authentication." The user accesses the URL from the terminal and displays the code display screen 200 on the operation display unit of the terminal.

The server 20 displays a report screen 180 for reporting completion of notification of the URL to the terminal, on the operation display unit of the device. For example, the report screen 180 includes a message 182 such as "A URL for accessing a code has been notified."

In step 306, it is determined whether or not the URL notified to the terminal has been accessed from the terminal. If such access has been performed, the process proceeds to step 308. In contrast, if such access has not been performed, the determination is repeatedly performed in step 306.

In step 308, a login screen 190 for receiving input of the first authentication information is displayed on the operation display unit of the terminal. The user inputs their user ID and password, and transmits an instruction to log in.

In step 310, an operation for authentication using the first authentication information is performed. It is determined whether or not information received from the user matches the first authentication information held by the authentication-information management unit. If the two pieces of information match each other, the authentication succeeds. If the two pieces of information do not match each other, the authentication fails.

In step 312, it is determined whether or not authentication using the first authentication information has succeeded. If authentication of the user has succeeded, the process proceeds to step 314. In step 314, the code display screen is displayed on the terminal, and the routine ends.

As illustrated in FIG. 15, the code display screen 200 on which a code 202 is displayed is displayed on the operation display unit of the terminal. The code 202 is issued to the user. The user remembers the code 202, and inputs the code 202 from the code input screen 160 illustrated in FIG. 11.

In contrast, if authentication of the user has failed, the process proceeds to step 316. In step 316, a message indicating that a code is not allowed to be displayed is displayed, and the routine ends.

In the first exemplary embodiment, a user opens a code display screen by using a URL on their terminal, and obtains a code. The method of obtaining a code is not limited to this. An electronic mail describing a code may be transmitted to the terminal so that the user is notified of the code. Alternatively, a code display screen may be displayed on the device.

Second Exemplary Embodiment

A second exemplary embodiment is different from the first exemplary embodiment in that, in requesting issue of a code, the second content is specified, and a code valid only for the specified second content is issued. The other configuration is substantially the same as that of the first exemplary embodiment. Only differences will be described.

Figures 16, 17:
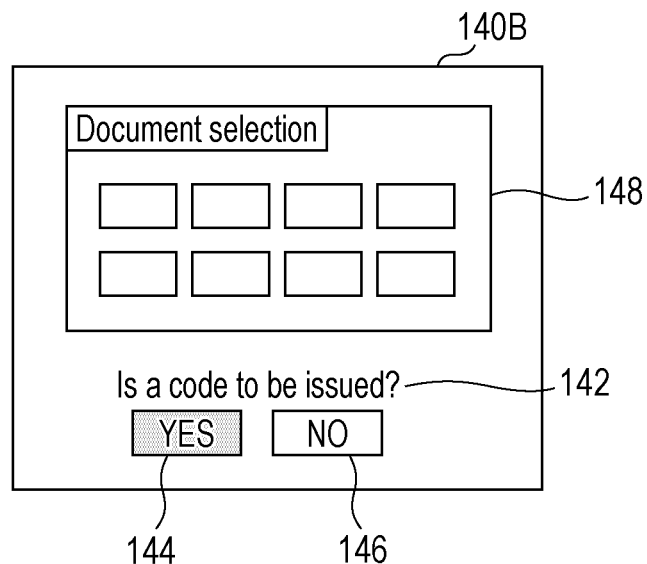
FIG. 16 is a schematic diagram illustrating an exemplary code issue request screen according to a second exemplary embodiment.
FIG. 17 is a diagram illustrating another exemplary code management table.

FIG. 16 is a schematic diagram illustrating an exemplary code issue request screen according to the second exemplary embodiment. The second content provided in this example is assumed to be "documents" that are to be printed. In the illustrated example, a code issue request screen 140B includes a specification receiving portion 148 for specifying documents that are to be accessed, as well as the message 142, the instruction button 144, and the instruction button 146. In the specification receiving portion 148, a list of documents that may be specified is displayed.

A user specifies documents and requests issue of a code. A code valid only for the specified documents is issued.

Even when a code is leaked, the documents that may be accessed by using the leaked code are limited to the specified documents.

FIG. 17 is a diagram illustrating another exemplary code management table. As illustrated in FIG. 17, the code management table stores the code, the expiry date for the code, and the accessible documents in association with each user ID. Accessible documents are specified, for example, by using the name of a folder in which the documents are stored. When a code is to be stored in step 202 of the "code issue process" illustrated in FIG. 13, a correspondence among the user ID, the issued code, the expiry date of the code, and the accessible documents is added to the code management table.

Third Exemplary Embodiment

A third exemplary embodiment is different from the other exemplary embodiments in that the device generates a code and authentication using a code needs decoding information stored in the device. Information about the user ID, a public key, and a secret key is held in an IC card. The other configuration is substantially the same as that of the first exemplary embodiment. Only differences will be described.

The Functional Configuration

Figure 18:
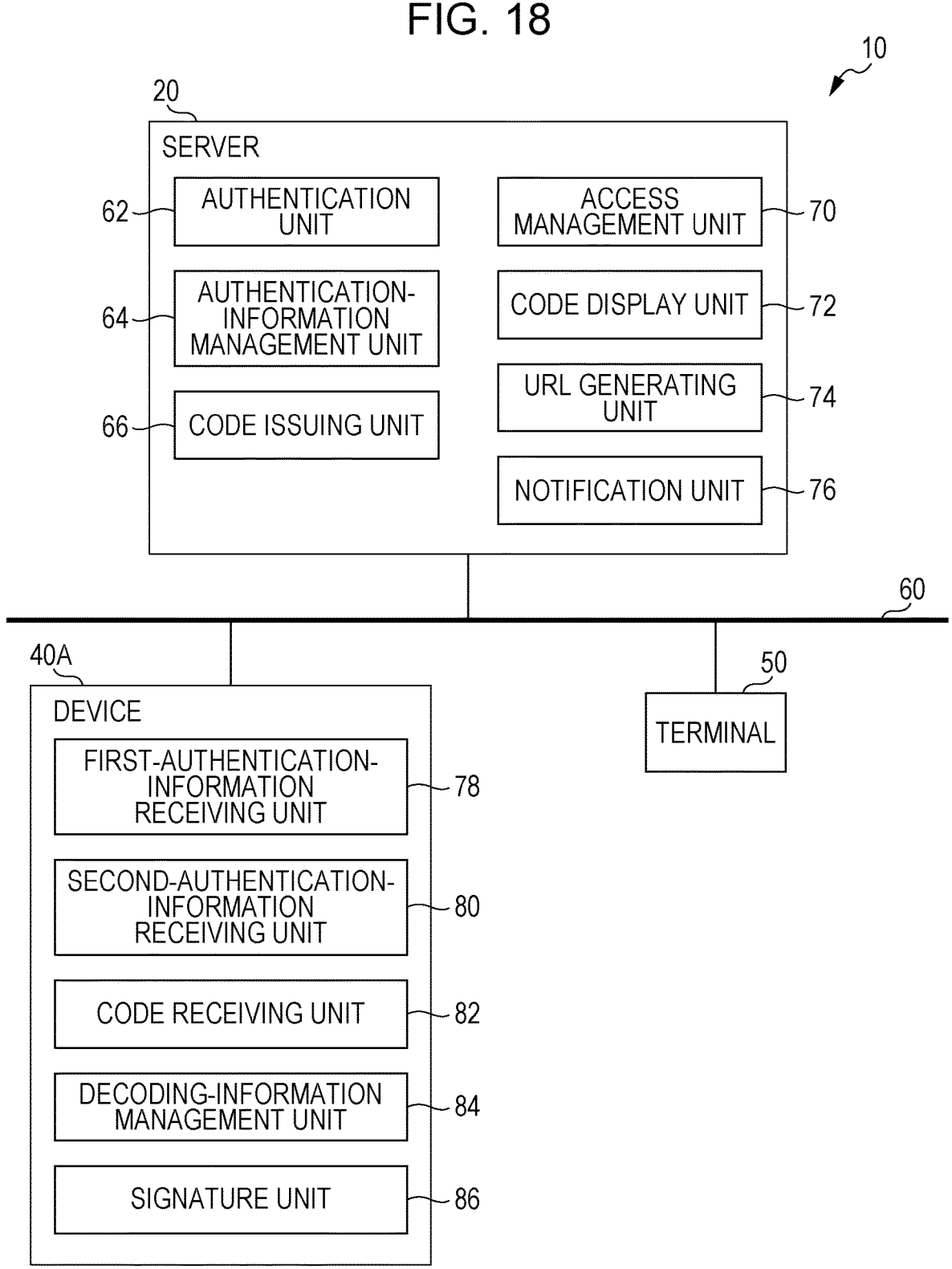
FIG. 18 is a block diagram illustrating an exemplary functional configuration of an information processing system according to a third exemplary embodiment.

FIG. 18 is a block diagram illustrating an exemplary functional configuration of an information processing system according to the third exemplary embodiment. As illustrated in FIG. 18, a device 40A according to the third exemplary embodiment includes a decoding-information management unit 84 and a signature unit 86 in addition to the first-authentication-information receiving unit 78, the second-authentication-information receiving unit 80, and the code receiving unit 82. The other configuration for which the identical reference numerals are used will not be described.

The signature unit 86 obtains a random number used in generation of a code. The signature unit 86 signs the obtained random number with the secret key held in an IC card, and generates a code. The signature unit 86 transmits the generated code to the code issuing unit 66 of the server 20.

Figures 20, 21:
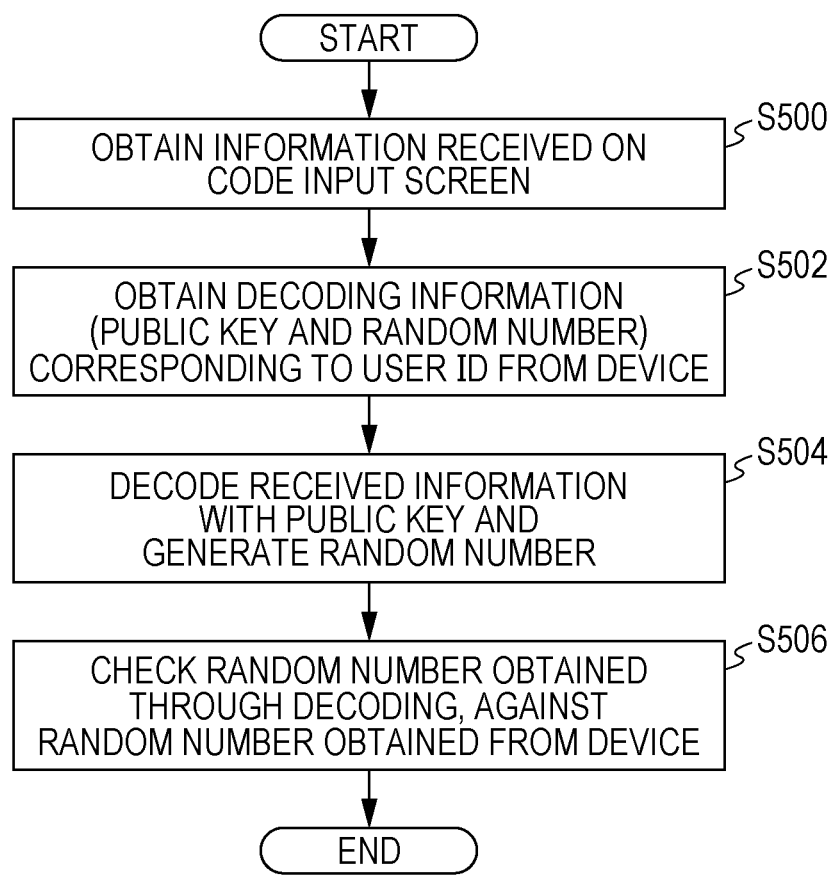
FIG. 20 is a diagram illustrating an exemplary decoding information management table managed by a device.
FIG. 21 is a flowchart of an exemplary authentication process using a code.

The decoding-information management unit 84 stores the random number and the public key as "decoding information". FIG. 20 is a diagram illustrating an exemplary decoding information management table managed in the device. In the decoding information management table, the random number and the public key which serve as decoding information are stored in association with each user ID.

The Authentication Process/Program

The flow of the "authentication process" performed by the server is substantially the same as the flowchart in FIG. 10. However, when a request to issue a code is received in step 130, a screen for prompting card authentication is displayed, and the process proceeds to step 132. The screen for prompting card authentication is a screen on which a message such as "Present your card to the IC card reader." is displayed. The process performed when the authentication using a code is performed in step 112 in FIG. 10 is changed to a complicated process. The "authentication using a code" according to the third exemplary embodiment will be described below.

The Code Generating Process Performed by the Device

In the third exemplary embodiment, a code is generated by the device.

Figure 19:
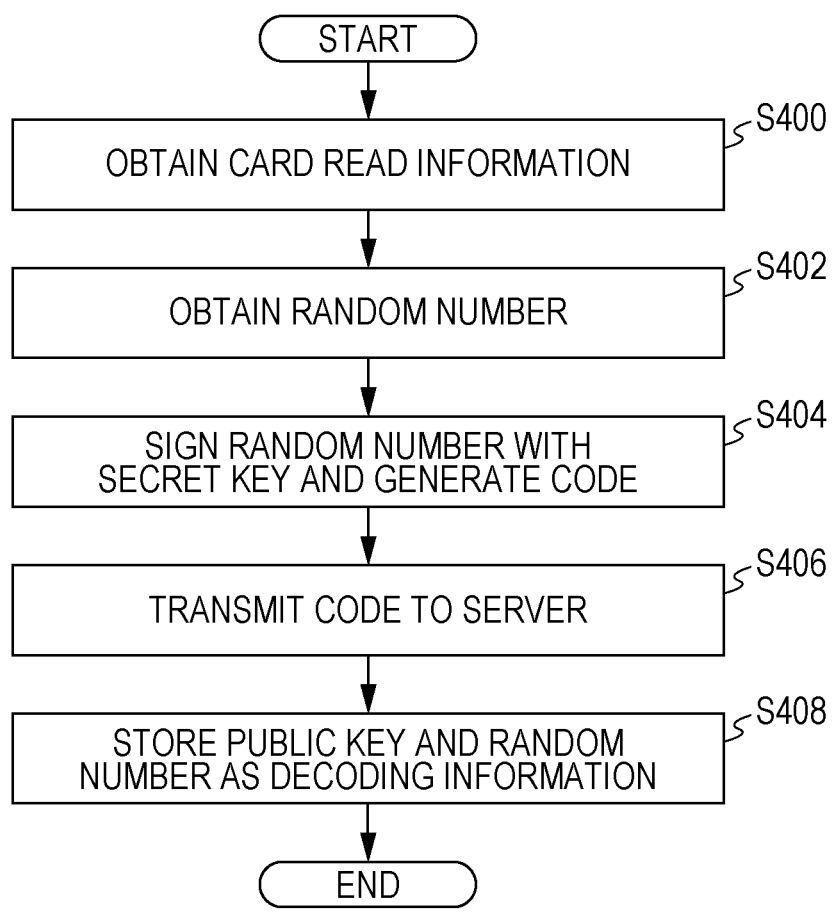
FIG. 19 is a flowchart of an exemplary code generating process performed by a device.

FIG. 19 is a flowchart of an exemplary "code generating process" performed by the device. The CPU 42A of the device 40 reads, for execution, the control program of the "code generating process" from the ROM 42B (see FIG. 3). The "code generating process" starts when an IC card is read.

In step 400, information read from the IC card is obtained. In step 402, a random number used in generation of a code is obtained. In step 404, the obtained random number is signed with the secret key held in the IC card, and a code is generated.

In step 406, the generated code is transmitted to the code issuing unit of the server. In step 200 in FIG. 13, the server issues the code, which is received from the device, to the user. In step 408, the random number and the public key are stored as "decoding information", and the routine ends. A correspondence among the user ID, the public key, and the random number is added to the decoding information management table illustrated in FIG. 20.

Authentication Using a Code Performed by the Server

The "authentication using a code" according to the third exemplary embodiment will be described. The "authentication using a code" according to the third exemplary embodiment is performed by the server instead of the "authentication using a code" in step 112 in FIG. 10. FIG. 21 is a flowchart of an exemplary authentication process using a code.

In step 500, information received from the user on the code input screen (the reference numeral 160 in FIG. 11) is obtained. In step 502, the decoding information (the random number and the public key) corresponding to the user ID is obtained from the device. In step 504, the information received from the user is decoded with the public key, and a random number is generated. In step 506, the random number obtained in step 504 is checked against the random number stored in the device, and the routine ends. If the random numbers match each other, the authentication succeeds. If the random numbers do not match each other, the authentication fails.

In the third exemplary embodiment, only when a user uses a device in which their decoding information is stored, the user is authenticated by using a code. Even when a code is leaked, the code fails to be used in a different device. Thus, damage such as unauthorized access to the second content is avoided.

Modified Examples

The configurations of the information processing apparatus, the information processing system, and the programs which are described in the above exemplary embodiments are exemplary. Needless to say, the configurations may be changed without departing from the gist of the present disclosure.

In the exemplary embodiments described above, the case in which the authentication process is implemented through software is described. Alternatively, an equivalent process may be implemented through hardware.

In the exemplary embodiments described above, the example in which the second authentication information is stored in a portable recording medium such as an IC card is described. Alternatively, part or all of the second authentication information may be formed of an authentication code generated at each designated time by a portable device such as a hardware token.

In the exemplary embodiments described above, the example in which a code is issued when a request to issue a code is received is described. Alternatively, a code may be automatically issued in a period in which authentication using the second authentication information is valid.

In the exemplary embodiments described above, the third authentication information may not be issued for part of the second content such as a top secret.

In the exemplary embodiments described above, the example of receiving input from a screen is described. Alternatively, voice input may be received.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a first hardware processor that, when authentication is successfully performed by using first authentication information received by a second hardware processor, permits access to first content, and, when authentication is successfully performed by using second authentication information which is received by the second hardware processor and which is different from the first authentication information, permits access to second content having a confidentiality level higher than a confidentiality level of the first content,
    wherein the first hardware processor issues third authentication information to a user in a period in which authentication using the second authentication information is valid after authentication is successfully performed by using the first authentication information, the third authentication information being different from the first authentication information and the second authentication information,
    wherein, when authentication is successfully performed by using both the first authentication information and the third authentication information, the first authentication information being received by the second hardware processor, the first hardware processor permits access to the second content.

2. The information processing apparatus according to claim 1,
    wherein the second hardware processor receives input of the first authentication information from a first reception screen, and
    wherein the second hardware processor receives input of the third authentication information from a second reception screen.

3. The information processing apparatus according to claim 2, further comprising:
    a display controller that, after authentication is successfully performed by using the first authentication information, displays the second reception screen, the second reception screen being used to receive input of the third authentication information.

4. The information processing apparatus according to claim 3,
    wherein the display controller displays the second reception screen in a period in which authentication using the first authentication information is valid.

5. The information processing apparatus according to claim 3,
    wherein, when a button for making a transition to the second reception screen is pressed, the button being included in a screen that is being displayed, the display controller displays the second reception screen.

6. The information processing apparatus according to claim 4,
    wherein, when a button for making a transition to the second reception screen is pressed, the button being included in a screen that is being displayed, the display controller displays the second reception screen.

7. The information processing apparatus according to claim 3,
    wherein, after authentication is successfully performed by using the second authentication information, the display controller displays a third reception screen, the third reception screen being a screen for receiving a request to issue the third authentication information.

8. The information processing apparatus according to claim 7,
    wherein the display controller displays the third reception screen in the period in which authentication using the second authentication information is valid.

9. The information processing apparatus according to claim 7,
    wherein, when a button for making a transition to the third reception screen is pressed, the button being included in a screen that is being displayed, the display controller displays the third reception screen.

10. The information processing apparatus according to claim 8,
    wherein, when a button for making a transition to the third reception screen is pressed, the button being included in a screen that is being displayed, the display controller displays the third reception screen.

11. The information processing apparatus according to claim 7,
    wherein the display controller displays a display screen, the display screen being a screen in which the third authentication information is displayed.

12. The information processing apparatus according to claim 11,
    wherein, when a request to issue the third authentication information is received, after authentication is successfully performed by using the first authentication information, the display controller displays the display screen, the display screen being a screen in which the third authentication information is displayed.

13. The information processing apparatus according to claim 1,
    wherein the first hardware processor notifies a user that the third authentication information has been issued.

14. The information processing apparatus according to claim 13,
    wherein the notification includes information for displaying a display screen, the display screen being a screen in which the third authentication information is displayed.

15. The information processing apparatus according to claim 1,
    wherein the first hardware processor issues the third authentication information with an expiry date, and
    wherein, when authentication is successfully performed by using the first authentication information and the valid third authentication infoi illation, the first hardware processor permits access to the second content.

16. The information processing apparatus according to claim 1,
wherein the first hardware processor issues the third authentication information for the second content specified by a user, and
wherein, when authentication is successfully performed by using the first authentication information and the third authentication information, the first hardware processor permits access to the specified second content.

17. The information processing apparatus according to claim 1,
wherein a secret key and a public key corresponding to the secret key are provided and stored in a memory, the secret key being specific to each user,
wherein the third authentication information issued to a user is a second string obtained by signing a first string with the secret key of the user, and
wherein, when the first string is obtained by decoding information with the public key of the user, the information being received by the second hardware processor, the public key being obtained from the memory, the first hardware processor permits access to the second content.

18. A non-transitory computer readable medium storing a program causing a computer to execute a process, the process comprising:
when authentication is successfully performed by using first authentication information received, permitting access to first content, and, when authentication is successfully performed by using second authentication information which is received and which is different from the first authentication information, permitting access to second content having a confidentiality level higher than a confidentiality level of the first content; and
issuing third authentication information to a user in a period in which authentication using the second authentication information is valid after authentication is successfully performed by using the first authentication information, the third authentication information being different from the first authentication information and the second authentication information,
wherein, when authentication is successfully performed by using both the first authentication information and the third authentication information, the first authentication information being received, access to the second content is permitted.

19. An information processing method comprising:
permitting access to first content when authentication is successfully performed by using first authentication information, and
permitting access to second content having a confidentiality level higher than a confidentiality level of the first content when authentication is successfully performed by using second authentication information and which is different from the first authentication information,
wherein third authentication information is issued to a user in a period in which authentication using the second authentication information is valid after authentication is successfully performed by using the first authentication information, the third authentication information being different from the first authentication information and the second authentication information,
wherein, when authentication is successfully performed by using both the first authentication information and the third authentication information, access to the second content is permitted.

* * * * *